United States Patent
Jepson et al.

(10) Patent No.: US 9,838,970 B2
(45) Date of Patent: Dec. 5, 2017

(54) COLLABORATIVE TRANSMISSION MANAGEMENT FOR SMART DEVICES

(71) Applicant: Intel Corporation, Santa Clara, CA (US)

(72) Inventors: Daniel Jepson, San Jose, CA (US); Charles Carter Jernigan, Santa Clara, CA (US); Nicholas Moe Khosravy, Palo Alto, CA (US); John Wei, Saratoga, CA (US); Fai Yeung, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/089,371

(22) Filed: Apr. 1, 2016

(65) Prior Publication Data

US 2017/0289915 A1 Oct. 5, 2017

(51) Int. Cl.
*H04W 52/02* (2009.01)
*H04W 4/00* (2009.01)
*H04Q 9/00* (2006.01)

(52) U.S. Cl.
CPC .......... *H04W 52/0261* (2013.01); *H04Q 9/00* (2013.01); *H04W 4/008* (2013.01); *H04Q 2209/40* (2013.01); *H04Q 2209/826* (2013.01)

(58) Field of Classification Search
CPC .... H04W 76/02; H04W 72/085; H04W 72/04
USPC ................. 455/445, 507, 552.1, 63.1, 422.1; 370/329, 315, 331, 252, 236
See application file for complete search history.

(56) References Cited

U.S. PATENT DOCUMENTS

| | | | | |
|---|---|---|---|---|
| 9,306,899 | B1* | 4/2016 | Vendrow | ................. H04L 51/34 |
| 2002/0026492 | A1 | 2/2002 | Fujita | |
| 2012/0022741 | A1* | 1/2012 | Moore | ..................... H04W 8/24 |
| | | | | 701/31.4 |
| 2015/0334706 | A1 | 11/2015 | Mukherjee | |
| 2016/0338078 | A1* | 11/2016 | Wang | .................... H04W 72/10 |

FOREIGN PATENT DOCUMENTS

| | | |
|---|---|---|
| JP | 2002335185 A | 11/2002 |
| JP | 2014064244 A | 4/2004 |
| JP | 2015111916 A | 6/2015 |

OTHER PUBLICATIONS

International Search Report and Written Opinion in International Patent No. PCT/US2017/020512 dated May 24, 2017, 7 pages.

* cited by examiner

*Primary Examiner* — Kiet Doan
(74) *Attorney, Agent, or Firm* — Patent Capital Group (57) ABSTRACT

One embodiment relates to an apparatus, comprising logic, at least partially incorporated into hardware, to determine whether a first device priority associated with a first smart device is greater than a second device priority associated with a second smart device; and responsive to a determination that the first device priority is greater than the second device priority: send first data associated with the first smart device from the first smart device to a primary communication device; and send a first message from the first smart device, the first message including a first indication that the second smart device is to transmit second data associated with the second smart device to the primary communication device.

13 Claims, 5 Drawing Sheets

COLLABORATIVE TRANSMISSION MANAGEMENT FOR SMART DEVICES

TECHNICAL FIELD

This application relates to the field of computing, and more particularly to collaborative transmission management for smart devices.

BACKGROUND

Bluetooth low energy (BLE) protocol is a wireless technology is a wireless communication protocol designed to allow wireless devices to communicate with one another within a wireless personal area network. Typical applications of the BLE protocol include health condition monitoring and fitness monitoring in which a smart device measures one or more parameters and reports the measurements to a primary device, such as a smartphone. Smart devices are generally electronic devices having the capability to connect, such as via a wirelessly connection, to other devices and/or networks and communicate at least somewhat autonomously via one or more protocols such as Bluetooth, WiFi, 4G, 3G, near field communication (NFC), etc. Currently, the Bluetooth energy (BLE) protocol allows a number of smart devices to communicate directly with a primary device which may cause negative performance issues as the number of smart devices within a system begins to multiply. Currently, the manner in which various smart devices, e.g., heart rate monitors, step monitors, glucose monitor, etc., communicate with the primary device is in accordance with their own independent respective periodicities and rules such as sending the latest data to the smartphone every second. For example, at time=0, a smart device may transmit its current value or values, transmit the next value or values at time=1 second, transmit the next value or values at time=2 seconds, transmit the next value or values at time=3 seconds, etc. However, because the transmissions from multiple smart devices are not coordinated, situations can arise in which, for example, a smart watch transmits a step value at time=1.3 second, 2.3 seconds, 3.3 seconds, etc.; a heart rate monitor sends values at time=1.6 seconds, 2.6 seconds, 3.6 seconds, etc., and a glucose monitor sends values at time=1.9 seconds, 2.9 seconds, 3.9 seconds, etc. While each smart device is transmitting its updated values to the smartphone at one second intervals, the cost of asynchronous wake ups of the processor(s) of the smartphone, e.g., to hand the data off to a respective application, is costly to power/battery consumption of the smartphone. This may result in draining of the smartphone battery rapidly and generally geometrically downward with the addition of more smart devices within the network. The cost of sending/receiving from smaller devices such as heart rate monitors is often lower than that of larger ones as smaller devices often have lower power primary processors. As the number of smart devices and corresponding usage proliferates beyond the scenarios originally contemplated in Bluetooth in which one smart device communicates with a single primary device, a significant drag on the battery performance of the primary device, such as a smartphone, occurs.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

One or more example embodiments are directed to collaboration of multiple smart devices to coordinate the transmission of data, such as heart rate data, blood pressure data, or step data, from the smart devices to a primary device (e.g., a smartphone) such that the measuring of data and sending of the respective data by each of the smart devices occur closer in time to each other than obtained by conventional systems. With conventional systems, the distribution of transmissions in time by different smart devices is simply not taken into account.

In accordance with various embodiments, the smart devices, the primary device, a user or any combination specify a plan indicating a time during which each smart device will transmit measured values to the primary device to minimize resource usage, such as battery usage, by the primary device. In particular embodiments, the smart devices may be instructed to transmit their respective data during the same wake cycle of one or more processors(s) associated with the primary device to make a corresponding more efficient use of the battery resources of the primary device. By avoiding unnecessary wake ups and sleep downs of the processor(s) resulting from conventional haphazard management-less systems for smart device transmission, transmissions of updates by the smart devices to the primary device can be temporally managed to achieve greater efficiency of resource usage of the primary device.

Figure 1:
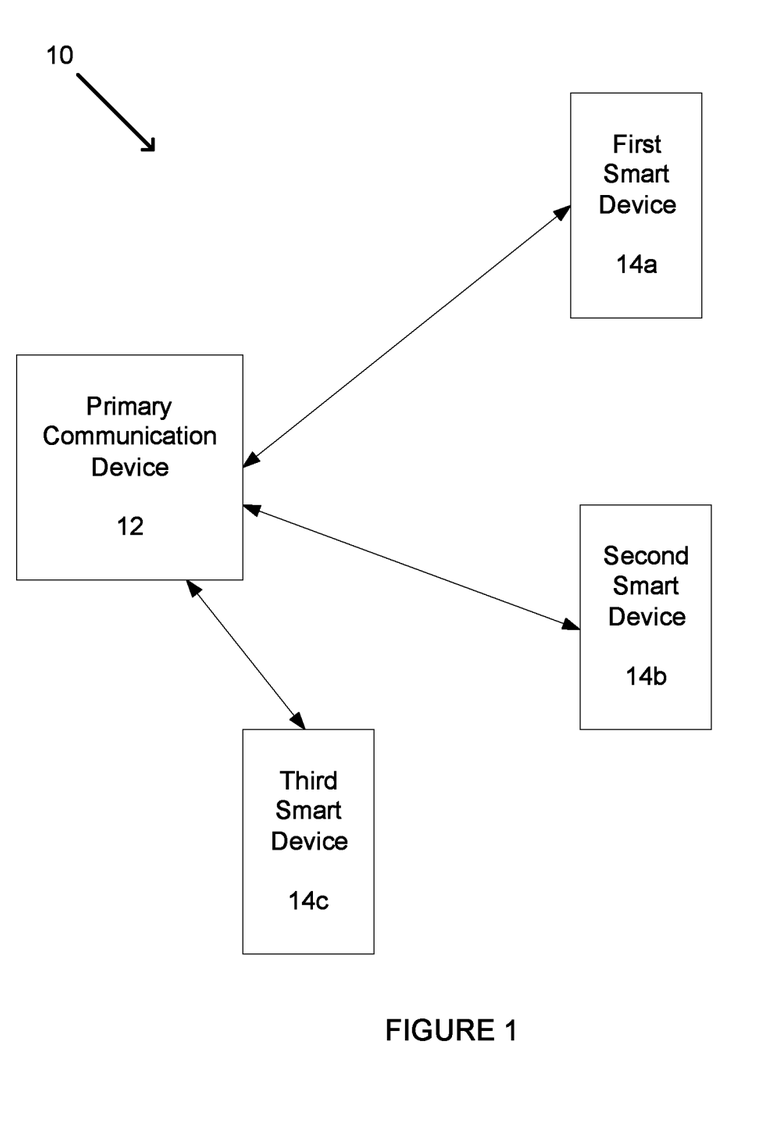
FIG. 1 illustrates an embodiment of a communication system for collaborative transmission management for smart devices.

FIG. 1 illustrates an embodiment of a communication system 10 for collaborative transmission management for smart devices. In the particular embodiment illustrated in FIG. 1, communication 10 includes a primary communication device 12, a first smart device 14a, a second smart device 14b, and a third smart device 14c. Primary communication device 12 is configured to wirelessly communicate with each of first smart device 14a, second smart device 14b, and third smart device 14c to receive data measured or otherwise obtained by each of the respective smart devices 14a-14c. In particular embodiments, primary communication device 12 communicates with each of first smart device 14a, second smart device 14b, and third smart device 14c using a Bluetooth low energy (BLE) communication protocol such as described in the Bluetooth Core Specification Version 4.0. In particular embodiments, primary communication device 12 is a communication and/or computing device, such as a smartphone, configured to received data obtained by one or more of first smart device 14a, second smart device 14b, and third smart device 14c. In particular embodiments, the primary communication device may be further configured to process the received data and perform one or more actions upon the processed data such as sending the processed data to a software application resident on primary communication device 12, displaying the processed data to a user of the primary communication device 12, and/or transmitting the processed data to a server.

One or more of first smart device 14a, second smart device 14b, and third smart device 14c include a wireless device configured to measure, sense, receive, or otherwise obtain data, such as measurement values associated with biometric data, health data and/or fitness data, and communicate the data to primary communication device 12. In particular embodiments, first smart device 14a, second smart device 14b, and third smart device 14c may include one or more of a smart watch, a fitness and/or activity tracker, a health monitor, a navigation device, a media playback device, a smart phone, smart jewelry, smart glasses, a head-mounted optical display, a headset, an ear-bud or any other suitable electronic device configured to communicate data with primary communication device 12. In at least one embodiment, primary communication device 12 is configured to communicate with each of first smart device 14a, second smart device 14b, and third smart device 14c using a BLE protocol. In still other embodiments, first smart device 14a, second smart device 14b, and third smart device 14c are further configured to wirelessly communicate with one another using a wireless communication protocol such as BLE. Although the embodiment of FIG. 1 is illustrated using three smart devices in communication system 10, it should be understood that in other embodiments any number of smart devices may be present.

In conventional system, each smart device transmits data according to its own transmission schedule. For example, if there are N smart device in a system each smart device will transmit data to the primary communication device at a time that is independent of any other smart device transmission. In a typical case, a smart device may transmit an update to the primary communication device every X seconds, e.g., once per second. Each one of these transmissions has an impact on processor usage, power consumption, and thus battery usage of the primary communication device. In conventional systems, there is no management of these transmissions from multiple smart devices.

Figure 2:
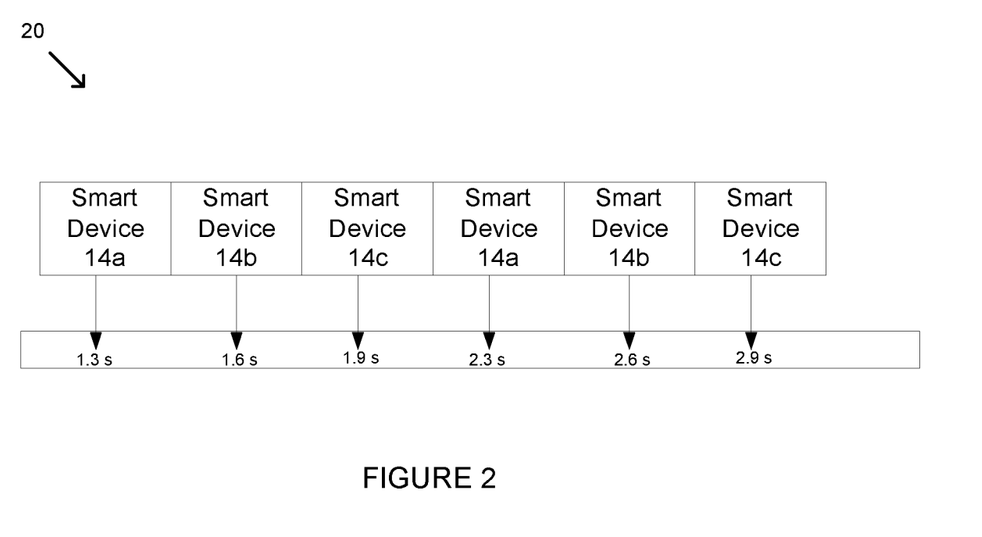
FIG. 2 illustrates an example of a transmission timing diagram for a conventional system.

FIG. 2 illustrates an example of a transmission timing diagram 20 for a conventional system. In the case illustrated in FIG. 2, each of first smart device 14a, second smart device 14b, and third smart device 14c transmit data to primary communication device 12 according to their respective schedules, schedule 1, schedule 2 and schedule 3, respectively. In the example of FIG. 1, schedule 1, schedule 2 and schedule 3 are each equal to one second such that each of first smart device 14a, second smart device 14b, and third smart device 14c transmit data to primary communication device 12 once every second in an independent and uncoordinated manner. In the particular example of FIG. 1, first smart device 14a transmits data to primary communication device 12 at 1.3 seconds and 2.3 seconds; second smart device 14b transmits data to primary communication device 12 at 1.6 seconds and 2.6 seconds; and third smart device 14c transmits data to primary communication device 12 at 1.9 seconds and 2.9 seconds. Due to the distribution in time of data transmissions received from first smart device 14a, second smart device 14b, and third smart device 14c, primary communication device 12 will, if not already in an active state, be required to awaken from any sleep state to receive the particular transmission and remain within the active state for a predetermined period of time. For the periods of time at which the primary communication device 12 is in the active state, processor usage, power consumption, and thus battery consumption will be greatly increased.

Figure 3:
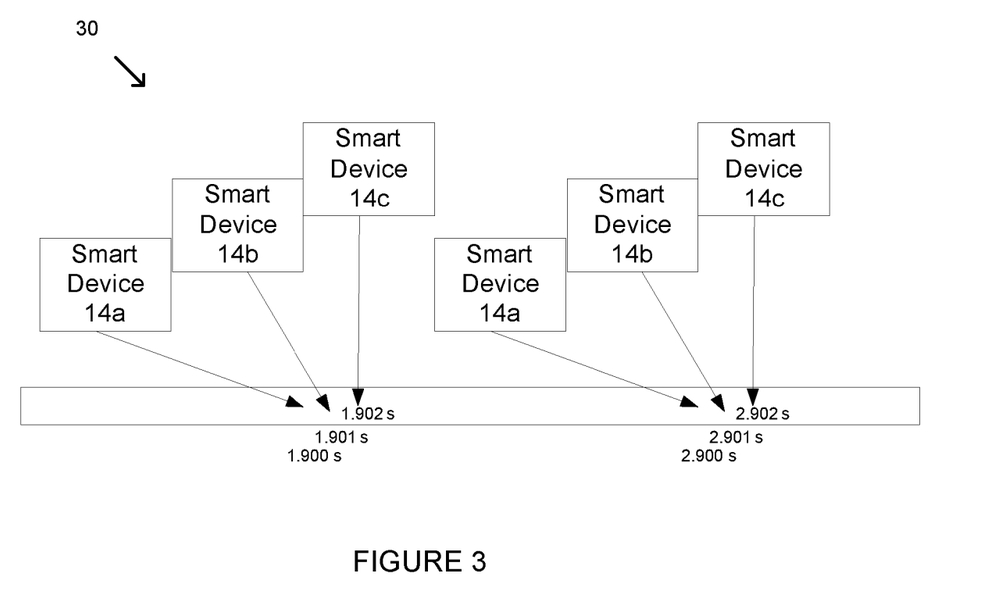
FIG. 3 illustrates an example of a transmission timing diagram for collaborative transmission management for smart devices according to an embodiment.

FIG. 3 illustrates an example of a transmission timing diagram 30 for collaborative transmission management for smart devices according to an embodiment. In the example of FIG. 3, one or more of first smart device 14a, second smart device 14b, and third smart device 14c participate in the formulation of a transmission plan to coordinate the transmission of data from each of first smart device 14a, second smart device 14b, and third smart device 14c. In a particular embodiment, primary communication device 12 instructs first smart device 14a, second smart device 14b, and third smart device 14c to adjust or delay their respective transmissions to primary communication device 12 so that one arrives after another in a relative short period of time to reduce the number of times the processor(s) of the primary communication device transitions into a sleep state between transmission. According, in the example of FIG. 3, instead of transmission from first smart device 14a, second smart device 14b, and third smart device 14c arriving at 1.3 seconds, 1.6 seconds and 1.9 seconds respectively, the transmissions arrive at 1.9 seconds, 1.901 seconds, and 1.902 seconds, respectively. Thereafter the transmissions arrive at primary communication device 12 at 2.9 seconds, 2.901 seconds and 2.902 seconds, and so on, making efficient usage of processor resources.

In the above example of FIG. 3, periodicities of first smart device 14a, second smart device 14b, and third smart device 14c are each once per second, but it should be understood that in other embodiments first smart device 14a, second smart device 14b, and third smart device 14c may have different periodicities. For example, transmission periodicities can also be accommodated to coordinate multiple smart devices by coordinating transmissions only for those smart devices that will be transmitting during a given cycle. In addition, in certain embodiments some smart devices may operate to only send data when a certain data batch size is reached and the transmission of such a data batch can be delayed to be consistent with transmissions of other smart devices as well. Furthermore, in some embodiments, some smart devices may operate such that they only transmit when requested to do so by primary communication device 12 in which such transmissions may be coordinated by primary communication device 12 instructing the particular smart device when to transmit relative to other transmit times.

In still another embodiment, primary communication device 12 may instruct each smart device separately, and anticipate when each smart device will complete its transmission so that the instructions to the next smart device to transmit can be initiated. In a particular embodiment, primary communication device 12 may instruct each smart device that has a certain respective window of time to transmit its data to primary communication device 12. In other embodiments, primary communication device 12 estimates the time that each particular smart device will need to transmit its data based on a history of transmission from the respective smart devices. For example, primary communication device 12 may estimate the number of packets, size of packets, transmission rate, packet loss, etc. that is associated with each smart device, and use that knowledge in planning an optimal transmission plan.

In certain embodiments, data priorities can be assigned to each smart device, so that if, for example, a window of opportunity to transmit is closing for two smart devices, the smart device with the higher priority data is instructed to transmit. In accordance with various embodiments, data priorities for respective smart devices can be assigned by the user, or implicitly (e.g., heart rate data indicative of a heart attack could be inherently highest priority data).

In other embodiments, the schedule, frequency or priority of transmission for a given smart device is adjusted based upon data rate change, data falling outside of ranges, etc. In other words, based upon an analysis of how data being reported by a particular smart device is changing or deviating from norms (e.g., standard deviation vs. rate of change), the frequency or priority with which this data is sent by the smart device is adjusted accordingly. For example, for a smart device sending video data using video encoding and/or run length encoding, in which a scene doesn't change for a period of time and then there is a sudden large delta between previous images and the current image, the frequency of transmission is adjusted (e.g., increased) to accommodate the need for the smart device to send the new data. Similarly, the frequency of transmission for a smart device may be increased due to the occurrence of a security event or other danger which requires a high reporting priority. In one embodiment, smart device transmissions are instructed to be made adjacent to one another, along with "wiggle room" around each transmission range, to allow for enough flexibility that different transmissions don't "collide" with one another.

In another embodiment, the smart devices are made aware of the presence of each other so that as a first smart device is finishing its transmission to primary communication device 12, it instructs a second smart device to begin its transmission to primary communication device 12. When the second smart device is about to finish, it instructs yet another smart device to transmit, and so on, until all smart devices have transmitted for a given cycle. In other embodiments, each smart device may have a backup transmission schedule in which a particular smart device transmits if it has not received an instruction from another smart device within a predetermined time period. For example, for situations in which a first smart device moves out of range or is not activated and a second smart device is waiting for an instruction to transmit from the first smart device, the second smart device may begin transmission if the instruction has not been received.

In still another embodiment, primary communication device 12 manages the control of smart device communication in which the primary communication device 12 utilizes a regular transmission schedule. For example, once per second primary communication device 12 may instruct first smart device 14a to transmit. Once first smart device 14a finishes its transmission, primary communication device 12 then instructs second smart device 14b to transmit.

In another embodiment, only some of the smart devices may support the schedule alignment scheme described herein. For example, in a particular situation a user has a legacy heart rate monitor that transmits once per second and a new step counter that implements the schedule alignment scheme described herein. Because the legacy heart rate monitor implements BLE sensor standards and sends one packet at a fixed interval, primary communication device 12 can detect this and request that a second device (e.g., a step counter) to schedule itself immediately in front of or behind the heart rate monitor. So while the heart rate monitor's schedule cannot be changed, other devices can be scheduled around it. In the case of multiple legacy devices in a system, scheduling can still be adapted although the system may be less efficient.

In an "asynchronous on demand" embodiment, in which the primary communication device requests data from the respective smart devices rather than the smart devices pushing data to the primary communication device 12, the primary communication device 12 can request a round of data from the smart devices when it makes sense for the primary communication device 12, e.g., when the processor(s) of the primary communication device 12 is otherwise awake for a different reason (e.g., a smartphone screen is activated), rather than waking up a sleeping processor to collect data in which, for example, no one is currently interested, where detailed data will be known not to be of interest, or where an approximation for a given hour will be good enough.

As described above, different priorities can be given for different kinds of data transmissions from smart devices. For example, for a situation in which transmissions every five minutes for a smart watch isn't required for all messages, two or more transmission modes may be used depending on whether the particular transmission is a user interaction message (in which case it may be scheduled at the next convenient or available opportunity whereas in contrast, step data may not be as instantaneously important. For example, whether a user is on her 7840 th step of the day or 7847 th step of the day may not be of such significance to be immediately reported if eventually the total count is the number of interest. For these kinds of data, the smart device can batch the data, queue the data, and transmit the data when it is convenient and/or a transmission opportunity is available.

Figure 4:
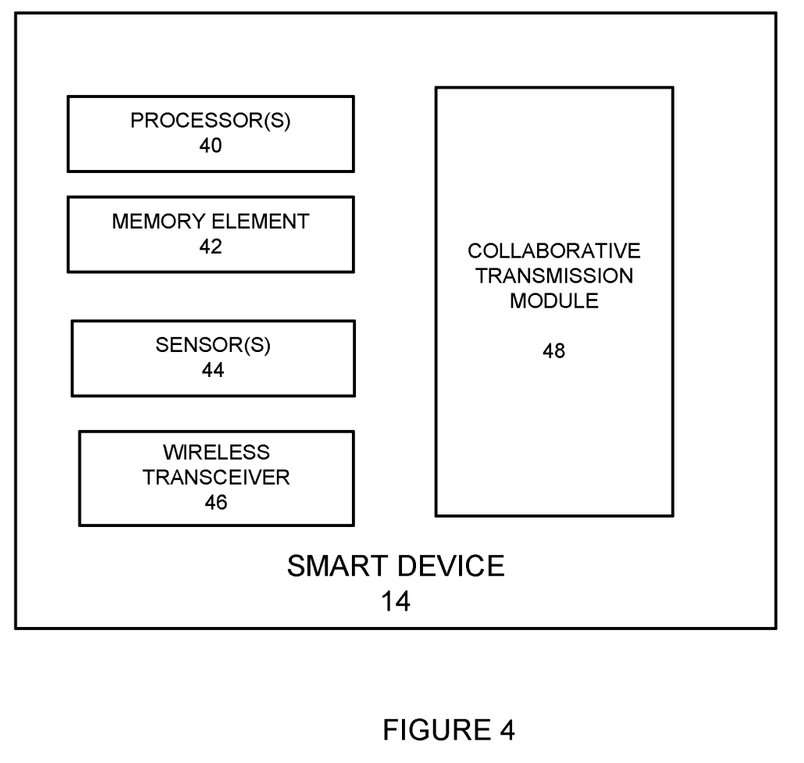
FIG. 4 illustrates an embodiment of a smart device of the communication system of FIG. 1.

FIG. 4 illustrates an embodiment of a smart device 14 of the communication system 10 of FIG. 1. In one or more embodiments, smart device 14 may include one or more of smart devices 14a-14c shown in FIG. 1. In the particular embodiment illustrated in FIG. 4, smart device 14 includes one or more processor(s) 40, a memory element 42, one or more sensors (44) a wireless transceiver 46, and collaborative transmission module 48.

Processor(s) 40 is configured to execute software instructions to perform various operations of smart device 14 as described herein. Processor(s) 40 may be any type of processor, such as a micro-processor, an embedded processor, a digital signal processor (DSP), a network processor, or other device to execute code. Although only one processor(s) 40 is illustrated in FIG. 4, it should be understood that smart device 14 may include more than one processor in some embodiments. Memory element 42 may be configured to store software instructions and data associated with smart device 12. Memory element 42 may be any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

Sensor(s) 44 may include any sensor configured to sense/measure a parameter associated with smart device 14 such as heart rate data, blood pressure data, step data, temperature data, glucose data, etc. Wireless transceiver 46 is configured to enable wireless communication with other smart devices and/or primary communication device 12. In particular embodiments, wireless transceiver may include one or more of a Bluetooth transceiver, a WiFi transceiver, a 3G and/or 4G transceiver, an NFC transceiver, ultrasound receiver, or any other suitable wireless transceiver. In one or more embodiments, wireless transceiver 46 is configured to transmit sensor data to primary communication device 12. In some embodiments, wireless transceiver 46 is further configured to transmit information to a second smart device within communication network 10 including an indication of a time at which the second smart device is to transmit its own sensor data to primary communication device 12. In other embodiments, the wireless transceiver 46 may transmit the indication of the time at which the second smart device is to transmits its own sensor data to primary communication device 12, and primary communication device 12 may relay the indication to the second smart device.

Collaborative transmission module 48 includes software and/or hardware to facilitate the collaborative transmission operations of smart device 14 as described herein. In one or more embodiments, collaborative transmission module 48 is configured to determine a time or window of time at which a next smart device is to begin transmitting its sensor data and generates an indication of the time to be transmitted directly or relayed to the next smart device. In particular embodiments, the indication is transmitted to the next smart device within communication network 10 responsive to smart device 14 transmitting its own sensor data to primary communication device 12. In one or more embodiments, an order in which each smart device 14*a*-14*c* within communication network 10 is determined according to a priority assigned to each of smart device 14*a*-14*c*.

In a particular example, first smart device 14*a* is assigned the highest priority among smart devices 14*a*-14*c*, second smart device 14*b* is assigned the next highest priority among smart devices 14*a*-14*c*, and third smart device 14*c* is assigned the lowest priority among smart devices 14*a*-14*c*, and each smart device 14*a*-14*c* is configured to store the priority associated with each smart device 14*a*-14*c*. Since first smart device 14*a* has the highest priority, it will transmit its sensor data to primary communication device 12 first. Upon first smart device 14*a* transmitting its sensor data to primary communication device 12, first smart device 14*a* determines the smart device having the next highest priority (i.e., second smart device 14*b*), and transmits an indication to second smart device 14*b* of a time at which second smart device 14*b* is to transmit its sensor data to primary communication device 12. Second smart device 14*b* then transmits its sensor data to primary communication device 12, determines the smart device having the next highest priority (i.e., third smart device 14*c*), and transmits an indication to third smart device 14*c* of a time at which third smart device 14*c* is to transmit its sensor data to primary communication device 12.

Figure 5:
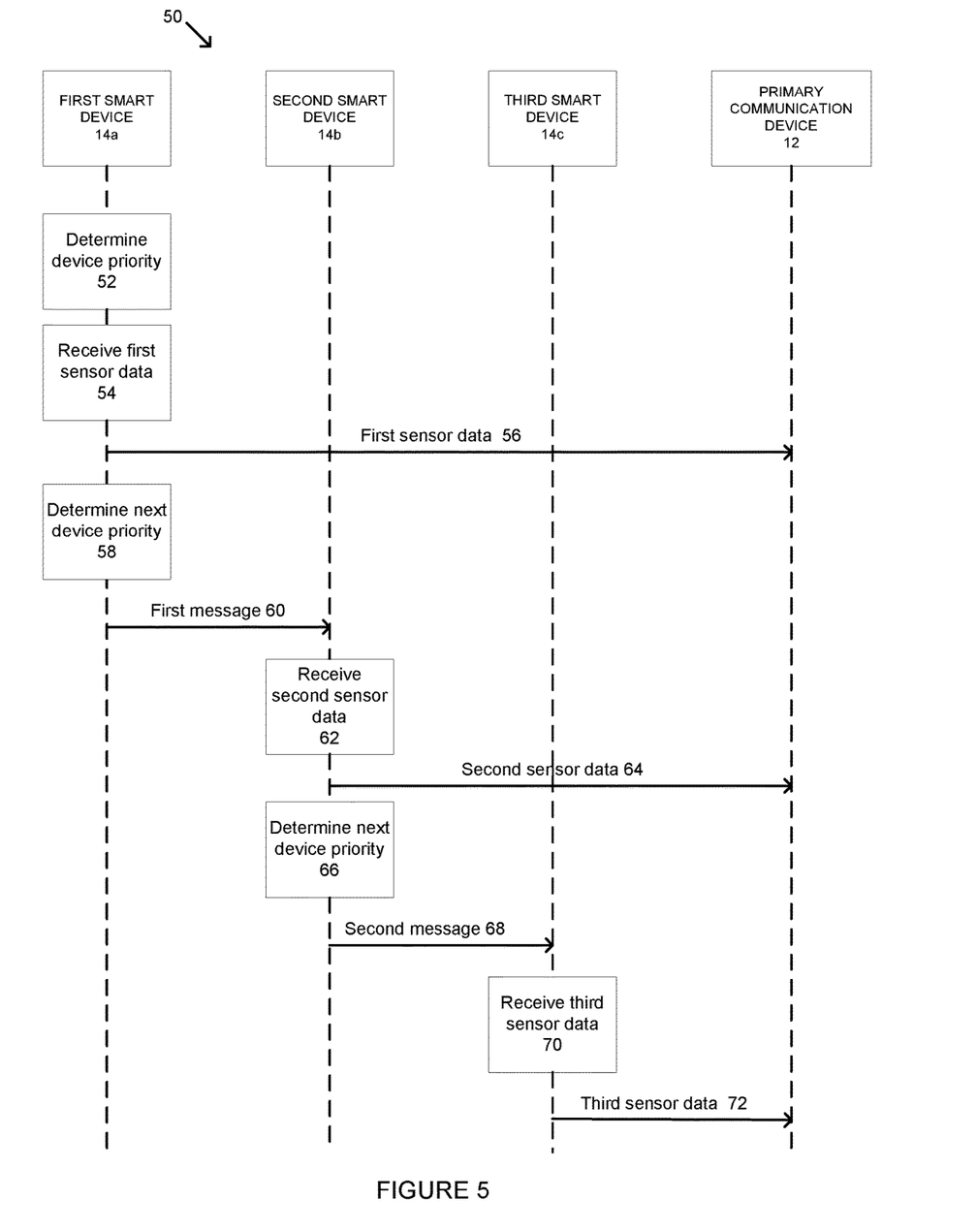
FIG. 5 illustrates a simplified flow diagram showing flows associated with the communication system of FIG. 1 in accordance with one embodiment.

FIG. 5 illustrates a simplified flow diagram 50 showing flows associated with the communication system of FIG. 1 in accordance with one embodiment. In the embodiment illustrated in FIG. 5, first smart device 14*a* is assigned the highest priority among smart devices 14*a*-14*c*, second smart device 14*b* is assigned the next highest priority among smart devices 14*a*-14*c*, and third smart device 14*c* is assigned the lowest priority among smart devices 14*a*-14*c*. In 52, first smart device 14*a* determines that it has the highest device priority among smart device 14*a*-14*c* and thus will be the first to transmit its sensor data to primary communication device 12. In 54, first smart device 14*a* receives first sensor data from its associated sensor(s). In 56, first smart device 14*a* transmits the first sensor data to primary communication device 12.

In 58, first smart device 14*a* determines that second smart device 14*b* has the next highest priority among smart devices 14*a*-14*c*. In 60, first smart device 14*a* sends a first message including a first indication of a first time at which second smart device 14*b* is to transmit its sensor data to primary communication device 12. In 62, second sensor device 14*b* receives second sensor data from its associated sensor(s). In 64, second smart device 14*b* transmits the second sensor data to primary communication device 12. In 66, second smart device 14*b* determines that third smart device 14*c* has the next highest priority among smart devices 14*a*-14*c*. In 68, second smart device 14*b* sends a second message including a second indication of a time at which third smart device 14*c* is to transmit its sensor data to primary communication device 12.

In 70, third smart device 14*c* receives third sensor data from its associated sensor(s). In 72, third smart device 14*c* transmits the third sensor data to primary communication device 12. In accordance with various embodiments, operations 52-72 may be periodically repeated to allow continued collection of data from smart devices 14*a*-14*c* by primary communication device 12. Although the embodiment of FIG. 5 is illustrated using three smart devices in communication system 10, it should be understood that in other embodiments any number of smart devices may be present.

Figure 6:
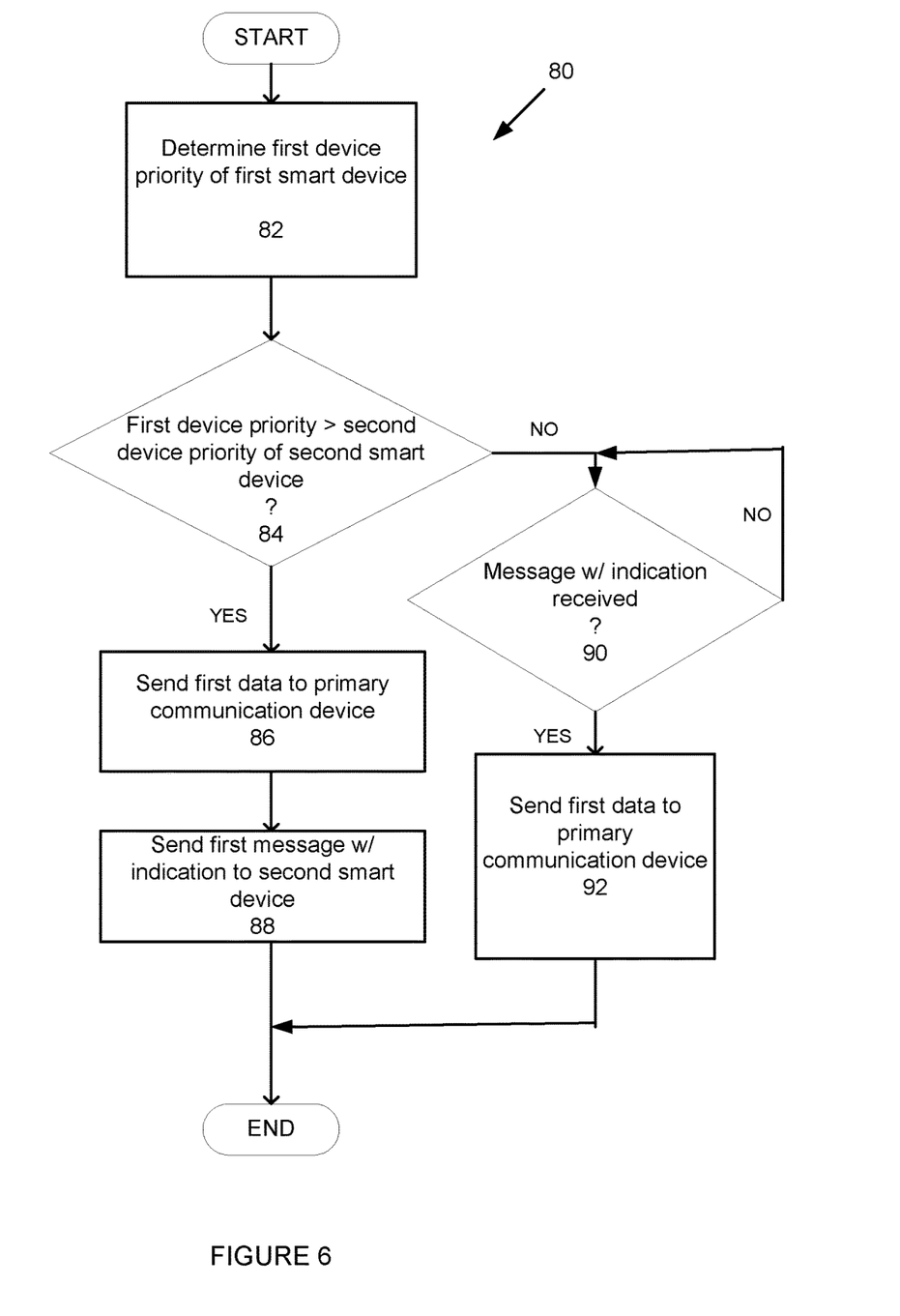
FIG. 6 illustrates a simplified flow chart showing operations associated with one or more smart devices in accordance with one embodiment.

FIG. 6 illustrates a simplified flow chart 80 showing operations associated with one or more smart devices in accordance with one embodiment. In 82, first smart device 14*a* determines a first device priority associated with first smart device 14*a*. In particular embodiments, the first device priority may be previously assigned to first smart device 14*a*. In 84, first smart device 14*a* determines a first device priority associated with first smart device 14*a* is greater than a second device priority associated with second smart device 14*b*. Responsive to a determination that the first device priority is greater than the second device priority the operations continue to 86 in which first smart device 14*a* sends first data associated with first smart device 14*a* to primary communication device 12. In 88, first smart device 14*a* sends a first message to second smart device 14*b* and the operations end. The first message includes a first indication that second smart device 14*b* is to transmit second data associated with second smart device 14*b* to primary communication device 12. In particular embodiments, second smart device 14*b* is configured to send the second data to primary communication device 12 responsive to receiving the first message. In other particular embodiments, the first data and the second data are sent to primary communication device 12 during a single wake cycle of a processor associated with primary communication device 12.

In still other embodiments, second smart device 14*b* is configured to determine whether the second device priority associated with second smart device 14*b* is greater than a third device priority associated with third smart device 14*c*; and responsive to a determination that the first device priority is greater than the second device priority, send a second message to third smart device 14*c*. The second message may include a second indication that third smart device 14*c* is to transmit third data associated with third smart device to primary communication device 12. In particular embodiments, the first indication includes a time at which second smart device 14*b* is to transmit the second data to primary communication device 12. In one or more embodiments, the first data associated with first smart device 14a includes sensor data received from at least one sensor associated with first smart device 14a.

In one or more embodiments, the first message is received by second smart device 14b directly from the first smart device 14a. In still other embodiments, the first message is received by the second smart device via primary communication device 12. In particular embodiments, at least one of the first data and the second data includes biometric data. In still other particular embodiments, primary communication device 12 includes a smartphone. In still other particular embodiments, primary communications device 12 can include a tablet computer, a laptop computer, a desktop computer, a smart watch, or any other suitable communication device.

Referring again to 84, if first smart device 14a determines that the first device priority is not greater than the second device priority the operations continue to 90. In 90, first smart device 14a determines whether a message including an indication has been received from another smart device, such as second smart device 14b or third smart device 14c, has been received by. If no message has been received the operations remain at 90. However, if a message including an indication is received by first smart device 14a, the operations continue to 92. In 92, first communication device sends the first data to primary communication device 12 and the operations end.

In regards to the internal structure associated with communication system 10, each of primary communication device 12, first smart device 14a, second smart device 14b, and third smart device 14c can include memory elements for storing information to be used in the operations outlined herein. Each of primary communication device 12, first smart device 14a, second smart device 14b, and third smart device 14c may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 10, such as primary communication device 12, first smart device 14a, second smart device 14b, and third smart device 14c, may include software modules to achieve, or to foster, operations as outlined herein. These modules may be suitably combined in any appropriate manner, which may be based on particular configuration and/or provisioning needs. In certain embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of primary communication device 12, first smart device 14a, second smart device 14b, and third smart device 14c may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

One or more embodiments described herein may provide an advantages of decreasing power consumption of a primary communication device via coordinated reception of data from a number of smart devices associated with the primary communication device.

EXAMPLES

The following examples pertain to further embodiments.

Example 1 is an apparatus, comprising logic, at least partially incorporated into hardware, to: determine whether a first device priority associated with a first smart device is greater than a second device priority associated with a second smart device; and responsive to a determination that the first device priority is greater than the second device priority: send first data associated with the first smart device from the first smart device to a primary communication device; and send a first message from the first smart device, the first message including a first indication that the second smart device is to transmit second data associated with the second smart device to the primary communication device.

In Example 2, the subject matter of Example 1 can optionally include wherein the second smart device is configured to send the second data to the primary communication device responsive to receiving the first message.

In Example 3, the subject matter of Example 1 can optionally include wherein the first data and the second data are sent to the primary communication device during a single wake cycle of a processor associated with the primary communication device.

In Example 4, the subject matter of Example 2 can optionally include wherein the second smart device is configured to: determine whether the second device priority associated with the second smart device is greater than a third device priority associated with a third smart device; and responsive to a determination that the first device priority is greater than the second device priority, send a second message from the second smart device to the third smart device, the second message including a second indication that the third smart device is to transmit third data associated with the third smart device to the primary communication device.

In Example 5, the subject matter of Example 1 can optionally include wherein the first indication includes a time at which the second smart device is to transmit the second data to the primary communication device.

In Example 6, the subject matter of Example 1 can optionally include wherein the first data associated with the first smart device includes sensor data received from at least one sensor associated with the first smart device.

In Example 7, the subject matter of Example 1 can optionally include wherein the first message is received by the second smart device directly from the first smart device.

In Example 8, the subject matter of Example 1 can optionally include wherein the first message is received by the second smart device via the primary communication device.

In Example 9, the subject matter of Example 1 can optionally include wherein at least one of the first data and the second data includes biometric data.

In Example 10, the subject matter of Example 1 can optionally include wherein the primary communication device includes one of a smartphone, a tablet computer, a laptop computer, a desktop computer, and a smart watch.

Example 11 is at least one non-transitory computer storage medium to store computer code comprising: computer code to determine whether a first device priority associated with a first smart device is greater than a second device priority associated with a second smart device; and responsive to a determination that the first device priority is greater than the second device priority: computer code to send first data associated with the first smart device from the first smart device to a primary communication device; and computer code to send a first message from the first smart device, the first message including a first indication that the second smart device is to transmit second data associated with the second smart device to the primary communication device.

In Example 12, the subject matter of Example 11 can optionally include wherein the second smart device is configured to send the second data to the primary communication device responsive to receiving the first message.

In Example 13, the subject matter of Example 12 can optionally include wherein the second smart device is further configured to: determine whether the second device priority associated with the second smart device is greater than a third device priority associated with a third smart device; and responsive to a determination that the first device priority is greater than the second device priority, send a second message from the second smart device to the third smart device, the second message including a second indication that the third smart device is to transmit third data associated with the third smart device to the primary communication device.

In Example 14, the subject matter of Example 11 can optionally include wherein the first indication includes a time at which the second smart device is to transmit the second data to the primary communication device.

In Example 15, the subject matter of Example 11 can optionally include wherein the first data associated with the first smart device includes sensor data received from at least one sensor associated with the first smart device.

In Example 16, the subject matter of Example 1 can optionally include wherein the first message is received by the second smart device directly from the first smart device.

In Example 17, the subject matter of Example 11 can optionally include wherein the first message is received by the second smart device via the primary communication device.

In Example 18, the subject matter of Example 11 can optionally include wherein at least one of the first data and the second data includes biometric data.

Example 19 is a computer-implemented method comprising: determining whether a first device priority associated with a first smart device is greater than a second device priority associated with a second smart device; and responsive to a determination that the first device priority is greater than the second device priority: sending first data associated with the first smart device from the first smart device to a primary communication device; and sending a first message from the first smart device, the first message including a first indication that the second smart device is to transmit second data associated with the second smart device to the primary communication device.

In Example 20, the subject matter of Example 19 can optionally include sending, by the second smart device, the second data to the primary communication device responsive to receiving the first message.

In Example 21, the subject matter of Example 20 can optionally include determining, by the second smart device, whether the second device priority associated with the second smart device is greater than a third device priority associated with a third smart device; and responsive to a determination that the first device priority is greater than the second device priority, sending, by the second smart device, a second message from the second smart device to the third smart device, the second message including a second indication that the third smart device is to transmit third data associated with the third smart device to the primary communication device.

In Example 22, the subject matter of Example 19 can optionally include wherein the first indication includes a time at which the second smart device is to transmit the second data to the primary communication device.

Example 23 is an apparatus, comprising logic, at least partially incorporated into hardware, to: determine whether a first device priority associated with a first smart device is greater than a second device priority associated with a second smart device; and responsive to a determination that the first device priority is greater than the second device priority: send first data associated with the first smart device from the first smart device to a primary communication device; and send a first message from the first smart device, the first message including a first indication that the second smart device is to transmit second data associated with the second smart device to the primary communication device.

In Example 24, the subject matter of Example 23 can optionally include wherein the second smart device is configured to send the second data to the primary communication device responsive to receiving the first message.

In Example 25, the subject matter of Examples 23-24 can optionally include wherein the first data and the second data are sent to the primary communication device during a single wake cycle of a processor associated with the primary communication device.

In Example 26, the subject matter of Example 24 can optionally include wherein the second smart device is configured to: determine whether the second device priority associated with the second smart device is greater than a third device priority associated with a third smart device; and responsive to a determination that the first device priority is greater than the second device priority, send a second message from the second smart device to the third smart device, the second message including a second indication that the third smart device is to transmit third data associated with the third smart device to the primary communication device.

In Example 27, the subject matter of Examples 23-24 can optionally include wherein the first indication includes a time at which the second smart device is to transmit the second data to the primary communication device.

In Example 28, the subject matter of Examples 23-24 can optionally include wherein the first data associated with the first smart device includes sensor data received from at least one sensor associated with the first smart device.

In Example 29, the subject matter of Examples 23-24 can optionally include wherein the first message is received by the second smart device directly from the first smart device.

In Example 30, the subject matter of Examples 23-24 can optionally include wherein the first message is received by the second smart device via the primary communication device.

In Example 31, the subject matter of Examples 23-24 can optionally include wherein at least one of the first data and the second data includes biometric data.

In Example 32, the subject matter of Examples 23-24 can optionally include wherein the primary communication device includes one of a smartphone, a tablet computer, a laptop computer, a desktop computer, and a smart watch.

Example 33 is at least one non-transitory computer storage medium to store computer code comprising: computer code to determine whether a first device priority associated with a first smart device is greater than a second device priority associated with a second smart device; and responsive to a determination that the first device priority is greater than the second device priority: computer code to send first data associated with the first smart device from the first smart device to a primary communication device; and computer code to send a first message from the first smart device, the first message including a first indication that the second smart device is to transmit second data associated with the second smart device to the primary communication device.

In Example 34, the subject matter of Example 33 can optionally include wherein the second smart device is configured to send the second data to the primary communication device responsive to receiving the first message.

In Example 35, the subject matter of Example 34 can optionally include wherein the second smart device is further configured to: determine whether the second device priority associated with the second smart device is greater than a third device priority associated with a third smart device; and responsive to a determination that the first device priority is greater than the second device priority, send a second message from the second smart device to the third smart device, the second message including a second indication that the third smart device is to transmit third data associated with the third smart device to the primary communication device.

In Example 36, the subject matter of Examples 33-34 can optionally include wherein the first indication includes a time at which the second smart device is to transmit the second data to the primary communication device.

In Example 37, the subject matter of Examples 33-34 can optionally include wherein the first data associated with the first smart device includes sensor data received from at least one sensor associated with the first smart device.

In Example 38, the subject matter of Examples 33-34 can optionally include wherein the first message is received by the second smart device directly from the first smart device.

In Example 39, the subject matter of Examples 33-34 can optionally include wherein the first message is received by the second smart device via the primary communication device.

In Example 40, the subject matter of Examples 33-34 can optionally include wherein at least one of the first data and the second data includes biometric data.

Example 41 is a computer-implemented method comprising: determining whether a first device priority associated with a first smart device is greater than a second device priority associated with a second smart device; and responsive to a determination that the first device priority is greater than the second device priority: sending first data associated with the first smart device from the first smart device to a primary communication device; and sending a first message from the first smart device, the first message including a first indication that the second smart device is to transmit second data associated with the second smart device to the primary communication device.

In Example 42, the subject matter of Example 41 can optionally include sending, by the second smart device, the second data to the primary communication device responsive to receiving the first message.

In Example 43, the subject matter of Example 41 can optionally include determining, by the second smart device, whether the second device priority associated with the second smart device is greater than a third device priority associated with a third smart device; and responsive to a determination that the first device priority is greater than the second device priority, sending, by the second smart device, a second message from the second smart device to the third smart device, the second message including a second indication that the third smart device is to transmit third data associated with the third smart device to the primary communication device.

In Example 44, the subject matter of Examples 41-43 can optionally include wherein the first indication includes a time at which the second smart device is to transmit the second data to the primary communication device.

Example 45 is an apparatus comprising means for performing the method of any of the preceding claims.

In Example 46, the subject matter of Example 45 can optionally include wherein the means for performing the method comprise a processor and a memory.

In Example 47, the subject matter of Example 46 can optionally include wherein the memory comprises machine-readable instructions, that when executed cause the apparatus to perform the method of any of Examples 41-44.

In Example 48, the subject matter of Examples 43-47 can optionally include wherein the apparatus is a computing system.

Example 49 is least one computer readable medium comprising instructions that, when executed, implement a method or realize an apparatus as found in any preceding Example.

What is claimed is:

1. An apparatus, comprising logic, at least partially incorporated into hardware, to:
   determine whether a first device priority associated with a first smart device is greater than a second device priority associated with a second smart device; and
   responsive to a determination that the first device priority is greater than the second device priority:
      send first data associated with the first smart device from the first smart device to a primary communication device; and send a first message from the first smart device, the first message including a first indication that the second smart device is to transmit second data associated with the second smart device to the primary communication device, wherein the first indication includes a time at which the second smart device is to transmit the second data to the primary communication device;

wherein, the second smart device is configured to:
send the second data to the primary communication device responsive to receiving the first message;
determine whether the second device priority associated with the second smart device is greater than a third device priority associated with a third smart device; and
responsive to a determination that the first device priority is greater than the second device priority, send a second message from the second smart device to the third smart device, the second message including a second indication that the third smart device is to transmit third data associated with the third smart device to the primary communication device.

2. The apparatus of claim 1, wherein the first data and the second data are sent to the primary communication device during a single wake cycle of a processor associated with the primary communication device.

3. The apparatus of claim 1, wherein the first data associated with the first smart device includes sensor data received from at least one sensor associated with the first smart device.

4. The apparatus of claim 1, wherein the first message is received by the second smart device directly from the first smart device.

5. The apparatus of claim 1, wherein the first message is received by the second smart device via the primary communication device.

6. The apparatus of claim 1, wherein at least one of the first data and the second data includes biometric data.

7. The apparatus of claim 1, wherein the primary communication device includes one of a smartphone, a tablet computer, a laptop computer, a desktop computer, and a smart watch.

8. At least one non-transitory computer storage medium to store computer code comprising:
computer code to determine whether a first device priority associated with a first smart device is greater than a second device priority associated with a second smart device; and
responsive to a determination that the first device priority is greater than the second device priority:
computer code to send first data associated with the first smart device from the first smart device to a primary communication device; and
computer code to send a first message from the first smart device, the first message including a first indication that the second smart device is to transmit second data associated with the second smart device to the primary communication device, wherein the first indication includes a time at which the second smart device is to transmit the second data to the primary communication device;

wherein, the second smart device is configured to:
send the second data to the primary communication device responsive to receiving the first message;
determine whether the second device priority associated with the second smart device is greater than a third device priority associated with a third smart device; and
responsive to a determination that the first device priority is greater than the second device priority, send a second message from the second smart device to the third smart device, the second message including a second indication that the third smart device is to transmit third data associated with the third smart device to the primary communication device.

9. The at least one non-transitory computer storage medium of claim 8, wherein the first data associated with the first smart device includes sensor data received from at least one sensor associated with the first smart device.

10. The at least one non-transitory computer storage medium of claim 8, wherein the first message is received by the second smart device directly from the first smart device.

11. The at least one non-transitory computer storage medium of claim 8, wherein the first message is received by the second smart device via the primary communication device.

12. The at least one non-transitory computer storage medium of claim 8, wherein at least one of the first data and the second data includes biometric data.

13. A computer-implemented method comprising:
determining whether a first device priority associated with a first smart device is greater than a second device priority associated with a second smart device; and
responsive to a determination that the first device priority is greater than the second device priority:
sending first data associated with the first smart device from the first smart device to a primary communication device;
sending a first message from the first smart device, the first message including a first indication that the second smart device is to transmit second data associated with the second smart device to the primary communication device, wherein the first indication includes a time at which the second smart device is to transmit the second data to the primary communication device;
sending, by the second smart device, the second data to the primary communication device responsive to receiving the first message;
determining, by the second smart device, whether the second device priority associated with the second smart device is greater than a third device priority associated with a third smart device; and
responsive to a determination that the first device priority is greater than the second device priority, sending, by the second smart device, a second message from the second smart device to the third smart device, the second message including a second indication that the third smart device is to transmit third data associated with the third smart device to the primary communication device.

* * * * *